N. H. MOTSINGER.
ROTARY ENGINE.
APPLICATION FILED JUNE 4, 1908. RENEWED DEC. 20, 1909.
960,992.
Patented June 7, 1910.
5 SHEETS—SHEET 3.
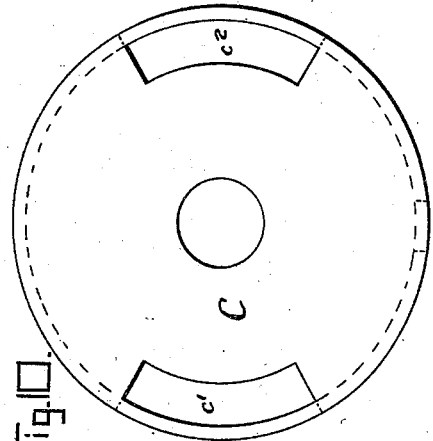
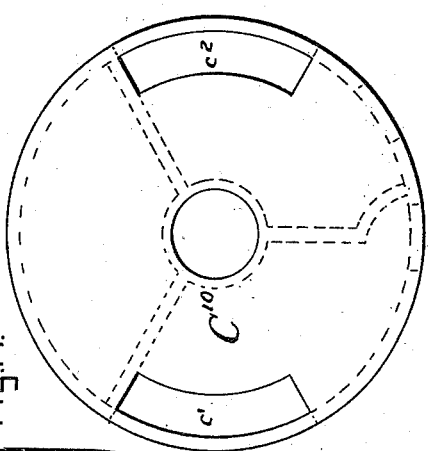
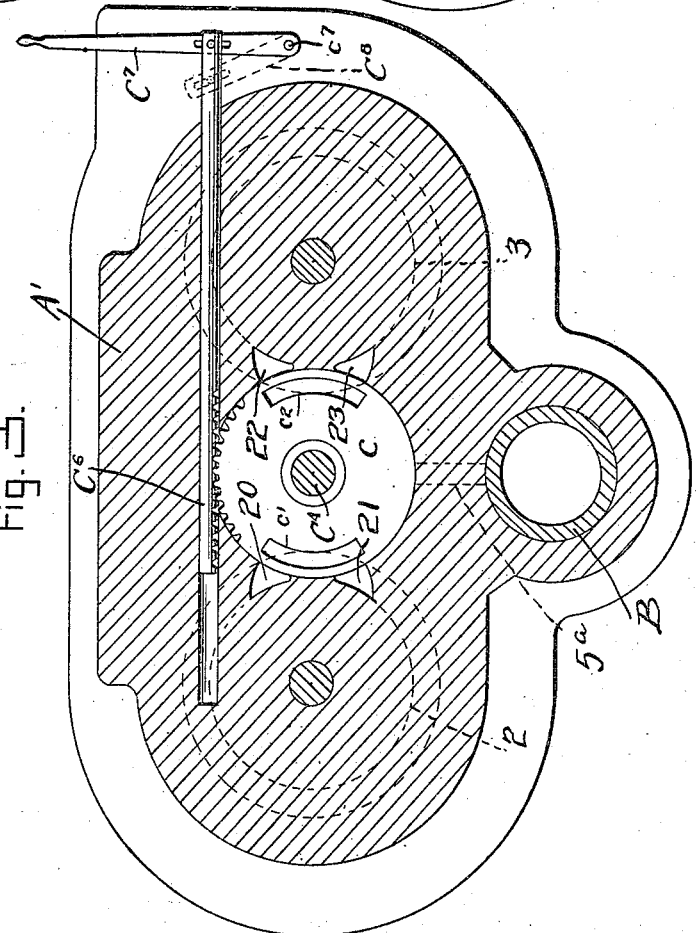
WITNESSES
INVENTOR
Newell H. Motsinger
per E. W. Bradford
Attorney

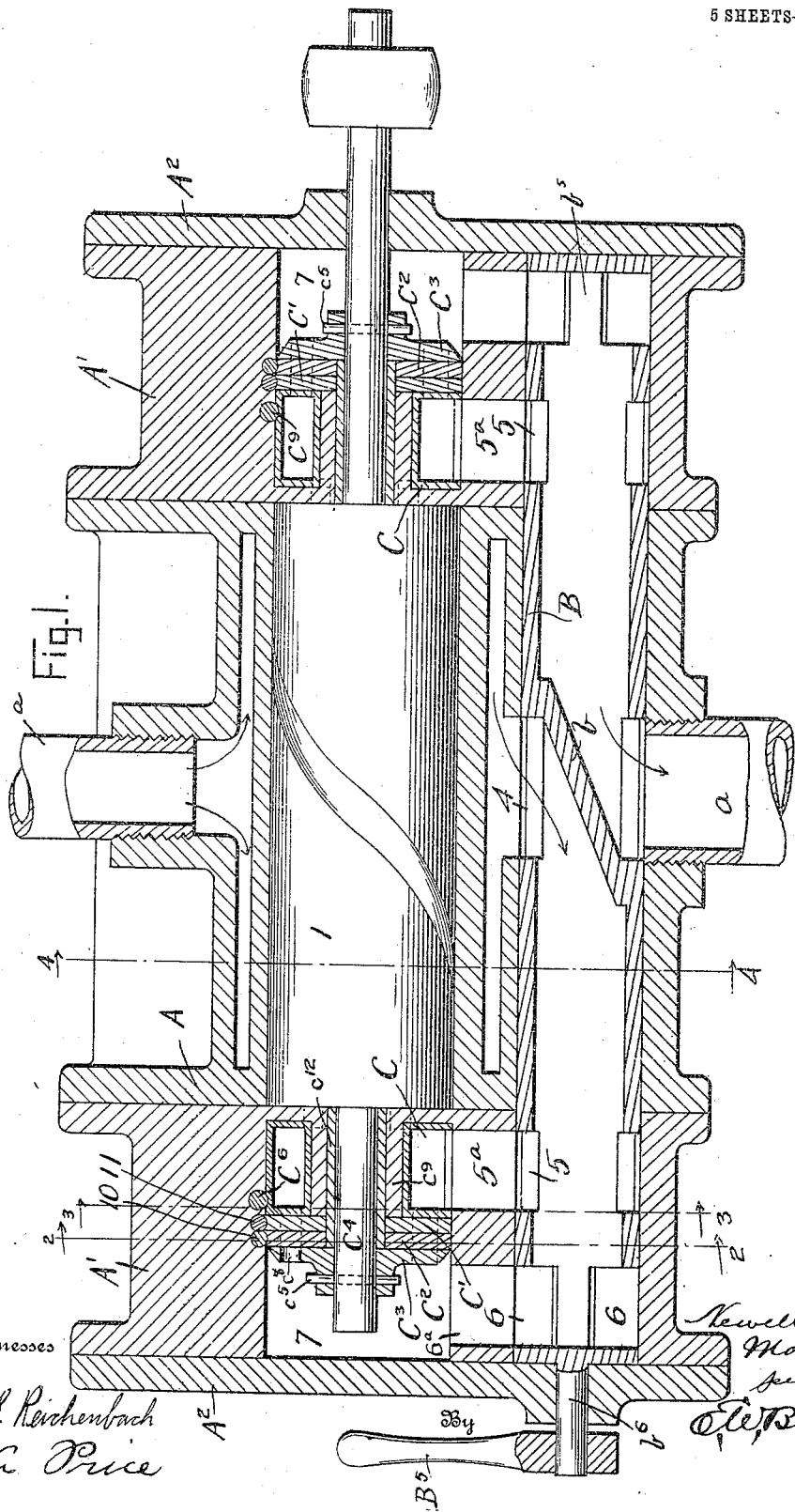

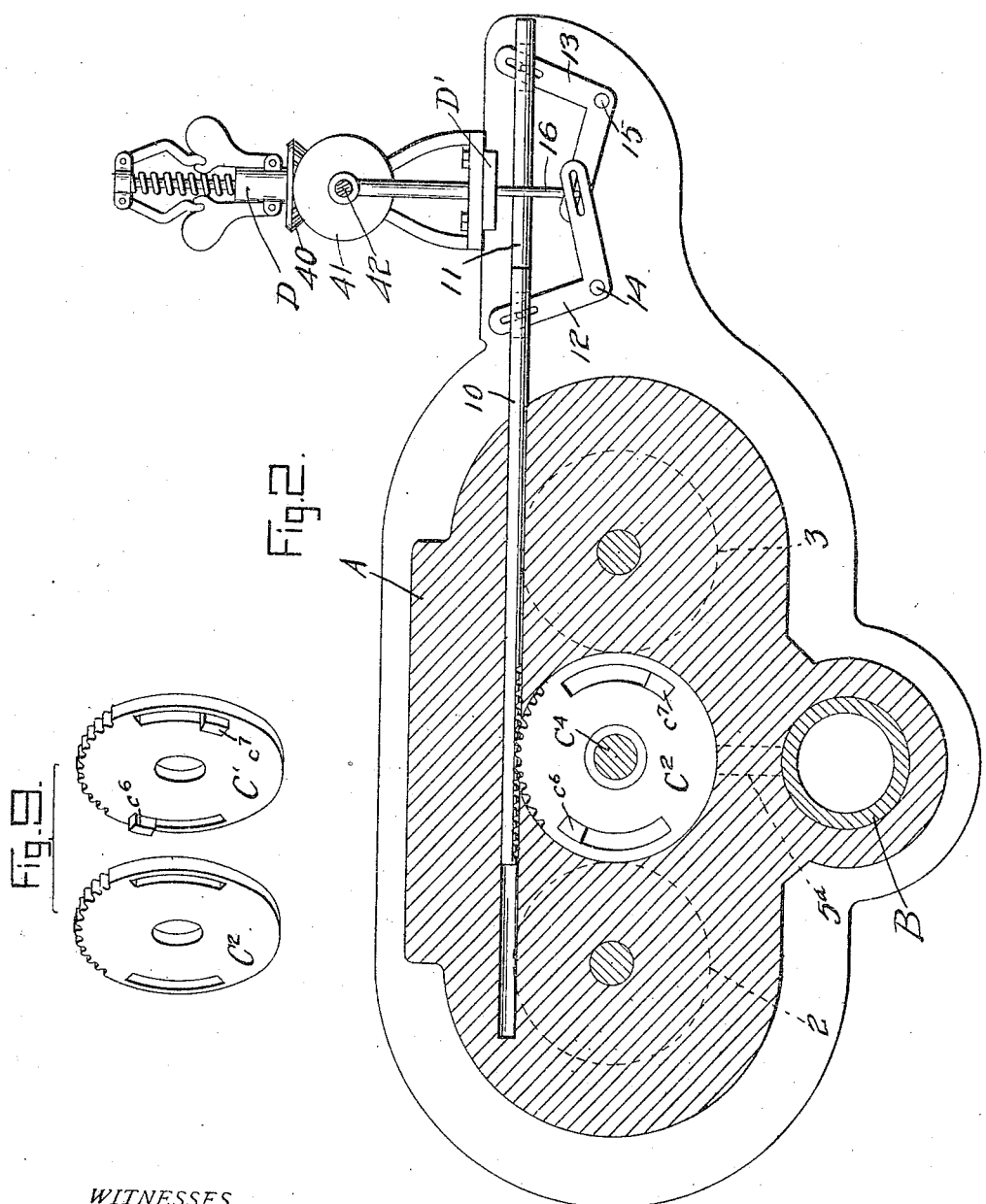

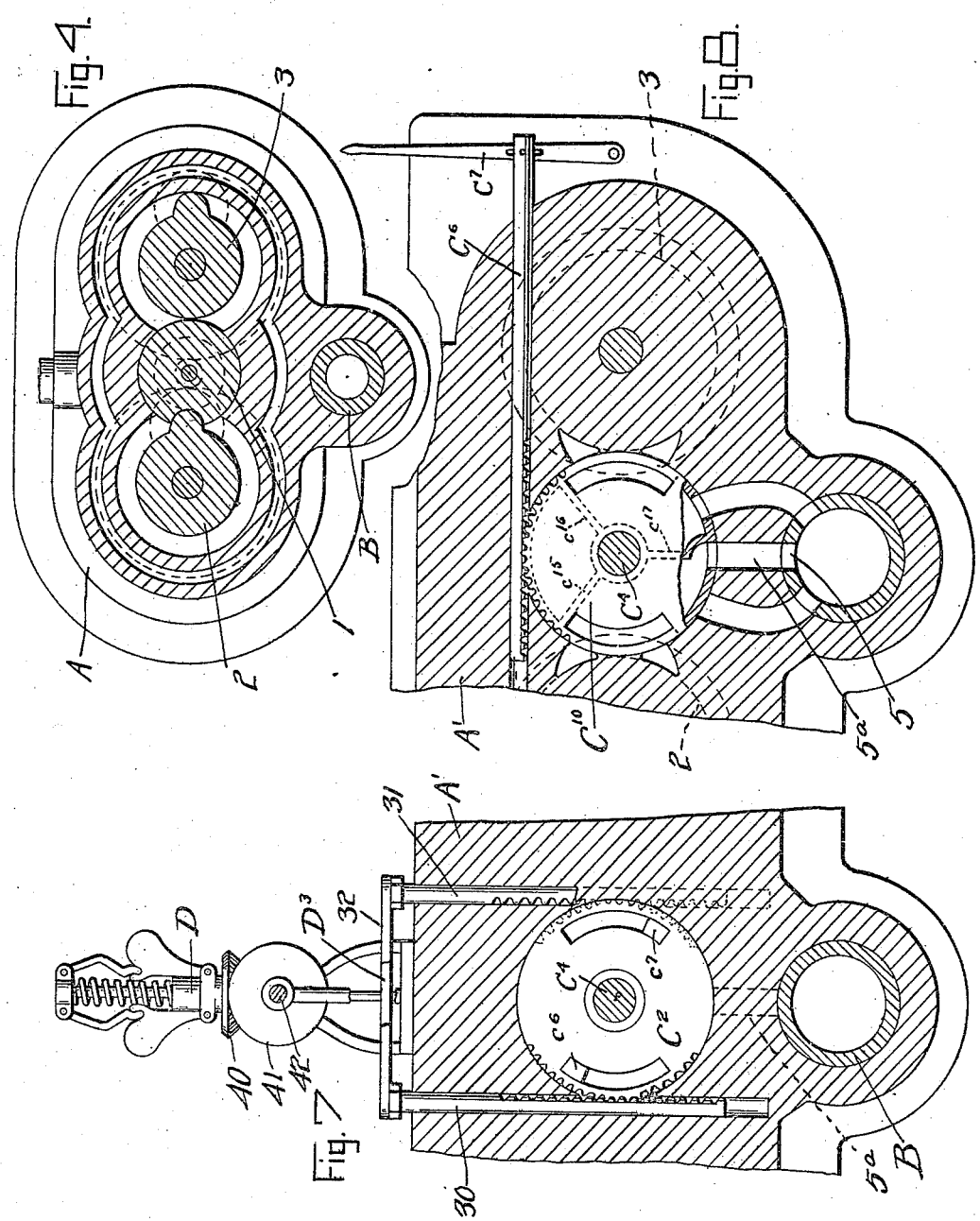

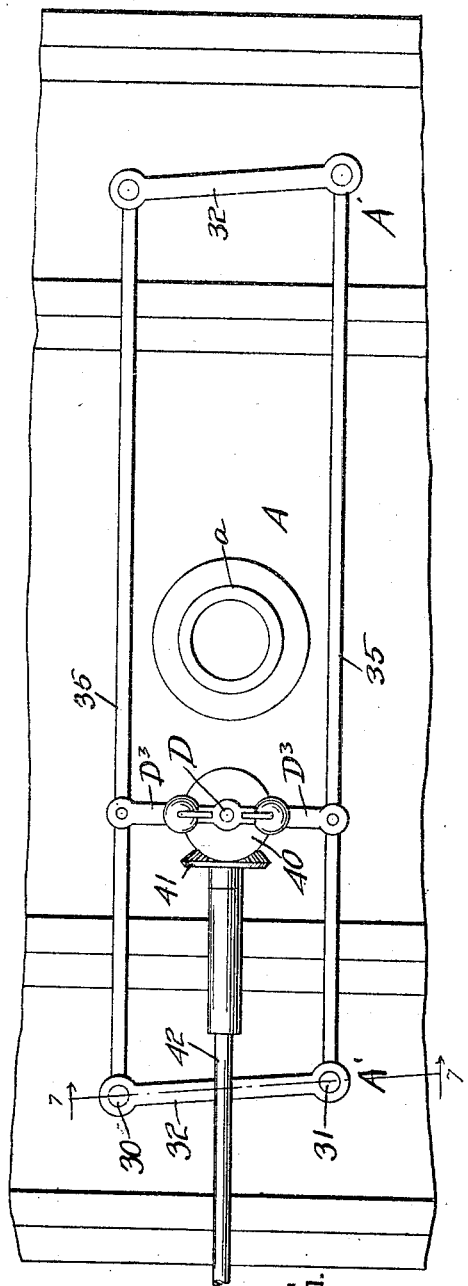
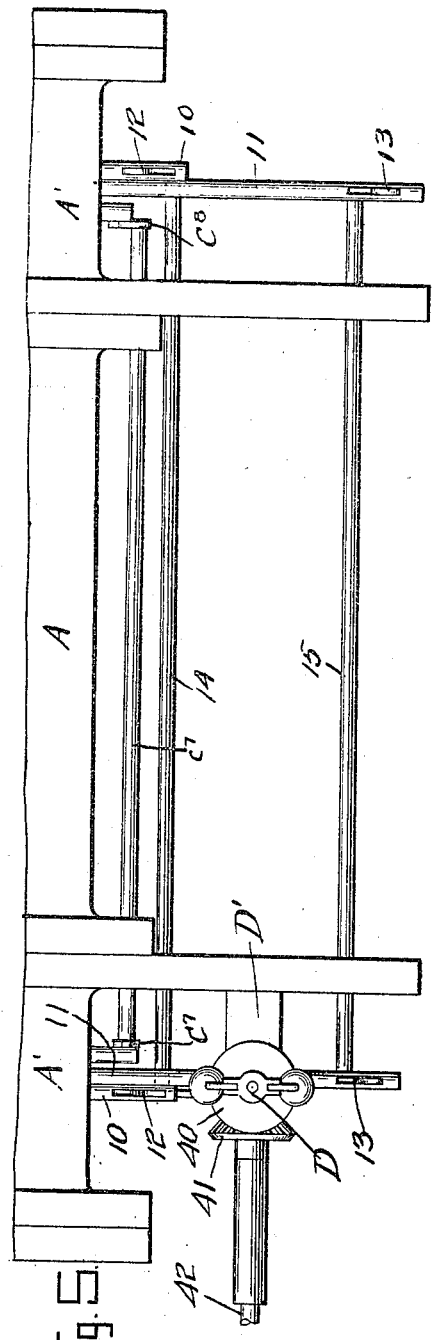

UNITED STATES PATENT OFFICE.

NEWELL H. MOTSINGER, OF GREENSBURG, PENNSYLVANIA.

ROTARY ENGINE.

960,992. Specification of Letters Patent. Patented June 7, 1910.

Application filed June 4, 1908, Serial No. 436,707. Renewed December 20, 1909. Serial No. 534,171.

*To all whom it may concern:*

Be it known that I, NEWELL H. MOTSINGER, a citizen of the United States, residing at Greensburg, in the county of Westmoreland and State of Pennsylvania, have invented certain new and useful Improvements in Rotary Engines, of which the following is a specification.

My said invention consists in certain improvements in the construction and arrangement of the valve gear and the means for operating the same of that type of rotary engines forming the subject matter of my former application No. 383,492 filed July 12, 1907, all as will be hereinafter more fully described and claimed.

Referring to the accompanying drawings which are made a part hereof and on which similar reference characters indicate similar parts, Figure 1 is a central longitudinal section through an engine of the type mentioned, embodying my said improvements, Fig. 2 a cross section on the dotted line 2—2 in Fig. 1, Fig. 3 a cross section on the dotted line 3—3 in Fig. 1, Fig 4 a cross section on the dotted line 4—4 in Fig. 1, Fig. 5 a detail top plan, Fig. 6 a similar view illustrating a modified arrangement, Fig. 7 a detail cross section illustrating said modification, Fig. 8 a detail cross section illustrating another modification, Fig. 9 a perspective view of the two plates, separated, forming the adjustable inlet port of the valve mechanism, Fig. 10 a face view of the main casing of the inlet valve and Fig. 11 a similar view of a modification thereof.

In said drawings the portions marked A represent the main engine casing, B the reversing valve, C the main casing of the steam inlet controlling valve, and D the governor. In general the construction of the engine is the same as shown and described in my application above mentioned and will therefore be only briefly outlined herein.

The casing A, as shown, is formed with three longitudinal bores to accommodate the three coöperating cylinders, 1, 2 and 3, which constitute the rotary piston of the engine, the central cylinder 1 being provided with a spiral groove, formed substantially as specified in my former Patent No. 726,969, and the two co-acting cylinders, arranged one on each side thereof, being each formed with a spiral vane adapted to mesh with and formed to fill said groove in cross section. Said vanes thus afford the surface against which the steam may expand to drive said cylinders and the point of mesh is the front end of a steam expansion chamber, said point advancing continually until it reaches the opposite end of the cylinders and opens into the exhaust ports. The bores for the cylinders 2 and 3 are formed of a diameter equal to the diameter of the bore for the central cylinder plus the height of the vane formed on each of said side cylinders, the main diameters of the several cylinders being uniform. See Fig. 4. On each end of the main casing A is secured a hollow casting A' provided with the necessary chambers, and ports to accommodate the valve mechanism. Plates $A^2$ are secured on the outer ends of said castings A' to cover said chambers and ports.

The reversing valve B is a hollow cylinder mounted in another bore in the casing A, beneath central cylinder 1, and extending at each end into chambers in the end casting A' and is formed with suitable ports for controlling the inlet and exhaust of the steam. The live steam comes into the engine through the inlet pipe $a$ and passes through a hollow channel in the casing A, which channel extends nearly the length of said casing and surrounds the bores for the cylinders 1, 2, and 3, and passes through the port 4, on the opposite side of the engine, into the hollow reversing valve B on one side of a cross partition $b$, which is located midway its length and separates one end of said valve from the other. The steam then passes through the port 5, $5^a$, into the hollow valve casing C, through ports in its periphery, and through the port 6, $6^a$ into the chamber 7 in the end casting A'. The ends of said valve B are formed with suitable journals $b^5$ and $b^6$ one of which, $b^6$ extends through one of the end plates $A^2$ and is provided with a lever $B^5$ by which said valve may be turned over to admit the steam on the opposite side of the partition $b$, and reverse the engine. Ports 6 are double the length of ports 5 and as soon as the engine is started the valve B is turned to close port $5^a$ of the receiving end, which will still leave port 6, $6^a$ open and admit steam to the engine during its operation only through valve C from chamber 7, ports 5, $5^a$ being used only in starting and before cylinder 1, which operates the inlet valve mechanism is in motion.

The valve casing C is formed as most clearly illustrated in Fig. 9 being a hollow closed cylinder with a port in one side of its periphery adapted to register with the ports 5, $5^a$. It also has near opposite edges segmental slots $c'$ and $c^2$ through its outer wall. It is mounted on a suitable hollow boss $c^0$ formed in port A'. The plate C' is mounted against the outer face of said casing C and is formed with slots adapted to register with said slots $c'$ and $c^2$ in said casing C. The plate $C^2$ is mounted against the outer face of said plate C' and is formed with slots which also register with slots in the plate C' and the casing C. Both of said plates C' and $C^2$ are formed with teeth on one edge and rack-bars 10 and 11 are mounted to slide in ways in said casing and adapted to engage with said teeth, the outer ends of said rack-bars being connected to one arm of bell-crank levers 12 and 13 respectively, mounted on pivot-rods 14 and 15, with their other arms both connected to the reciprocating rod 16 of the governor D. The pivot-rods 14 and 15 extend from end to end of the engine and are connected in a similar manner at each end to the respective parts so that both ends are operated by the governor. The plate $C^3$ is mounted against the outer face of plate $C^2$ and secured rigidly to the shaft $C^4$ of the cylinder 1 by means of a pin $c^5$, which extends transversely through a perforation in the hub of said plate $C^3$ and said shaft $C^4$. The plate C' is formed with lugs $c^6$ and $c^7$ at opposite ends of the respective slots therein, which are adapted to fit into the slots formed in the plate $C^2$ and limit their independent movement. Plate $C^3$ is formed with a single port hole $c^8$ adapted to pass over the slots in plates C' and $C^2$ as it revolves with shaft $C^4$, said plates C' and $C^2$ being held stationary on an extended end of the bushing $c^{12}$ of the bearing for shaft $C^4$.

The above description applies to the construction illustrated most clearly in Fig. 1 and with the parts arranged as shown in said figure, wherein the steam is admitted at the left-hand end of the engine and exhausts at the right-hand end. It is understood, of course, that the construction of the several parts at the two ends of the engine, including the steam controlling mechanism are identical, the right-hand end being arranged to exhaust the steam while the left-hand end is arranged to admit the steam.

With the construction thus described, and as illustrated in Fig. 1, the operation is as follows: The steam is admitted through the pipe $a$ into the hollow channel in the casing A surrounding the cylinder bores and passes around said bores, warming and slightly expanding said casing and thus preventing any binding between the cylinders and casing in starting. It passes through the port 4 on the lower side of said casing into the reversing valve B on the left-hand side of the partition $b$, and then passes through the ports 5, $5^a$ and 6, $6^a$ into the casing C of the valve and the chamber 7 in the casting A' outside of said valve. Immediately on the steam being admitted to the casing C through the port 5, $5^a$ it passes out through ports 20, 21, 22 and 23 into the chambers behind the vanes of the cylinders 2 and 3 starting the rotation of said cylinders. The valve B is then turned by means of the lever $B^5$ so as close port 5, which is only one half the length of the port 6, as above described, so that the only outlet from the reversing valve B is then through the port 6, $6^a$, into the chamber 7. At each revolution of the cylinder 1, port $c^8$ in plate $C^3$ is carried over the slots $c'$ and $c^2$ leading into the casing C, alternately passing over each of said slots once at each revolution of said cylinder, thus admitting steam to casing C twice at each revolution. As the cylinders 1, 2, and 3 revolve the chambers formed between the walls of the side bores and the adjacent cylinders and the vane on each side cylinder continually widen and advance until at the opposite end of the engine they open into the ports leading into the valve casing C at that end of cylinder 1, which is adjusted to register with ports $5^a$, 5 leading into the reversing valve B on the right-hand side of the partition $b$, permitting the steam to exhaust through the exhaust pipe $a'$.

Each valve casing C is formed with teeth on its top edge, as shown in Fig. 3, and a rack-bar $C^6$ is mounted to slide in a suitable way in said casing and formed to engage with said teeth, said rack-bar being connected at its outer end with a lever $C^7$ mounted on a pivot-rod $c^7$, which extends from one end of the engine to the other, and on its opposite end has an arm $C^8$ similarly pivoted to another rack-bar arranged to engage with the teeth of the valve casing C on the other end of the engine. Said arm $C^8$ stands at an angle to the lever $C^7$, as illustrated most plainly by dotted lines in Fig. 3, the angle being such that when lever $C^7$ is thrown so that the ports of the casing C at one end are arranged to take steam for the engine, they will be arranged at the other end to exhaust the steam from the engine.

The governor D is of a common construction, or may be any governor found appropriate. It rests upon a suitable bracket D' on the side of the engine, as shown in Figs. 2 and 5, and above the engine on a suitable support, as shown in Figs. 6 and 7. It is operated by gear connected with the engine shaft consisting, in part, of the miter gears 40 and 41 and a shaft 42, which is geared to said engine shaft in any suitable manner. Its operation is so well known that no further description will be necessary. The reciprocating rod 16 being connected to the inner end of the angle levers 12 and 13, as shown in Fig. 2, it is evident that as the speed of the engine increases rack-bars 10 and 11 will be operated to turn plates C' and C² so as to shorten the slots c' and c² and limit the intake of steam, while as the engine slows down the slots will be lengthened and the supply of steam thus increased.

As shown in Figs. 6 and 7, the governor rod 16 carries a cross-bar D³, which, in turn is connected to longitudinal bars 35 which run from end to end of the engine and carry cross-bars 32, which carry vertical rack-bars 30 and 31, mounted in vertical ways and engaging with teeth on opposite edges of the plates C' and C², respectively. As the rack-bars 30 and 31 are raised and lowered by the operation of the governor, the plates C' and C² will be turned to regulate the supply of steam as in the form above described. It will be understood of course, that either arrangement may be used as preferred, or any other form of connection between the governor and these regulating plates, as may be found suitable.

In the form of valve C as shown in the principal views, steam will be admitted to both sides of the engine simultaneously.

In Figs. 8 and 11 is shown a modified form, C¹⁰, having partitions $c^{15}$, $c^{16}$ and $c^{17}$, which divide its interior into three separate chambers. The chamber between partitions $c^{15}$ and $c^{16}$ is closed. The chambers between the partitions $c^{15}$ and $c^{17}$ and $c^{17}$ and $c^{16}$, communicate respectively with the ports 5, 5ª, and also with the slots in the face wall of the casing. In this construction the steam will be admitted alternately to the chambers surrounding the cylinders 2 and 3, respectively, once at each revolution of the shaft C⁴ and plate C³. At each revolution the port $c^8$ in said plate will pass first over one slot on one side of the casing and admit to the cylinder on that side of the engine and when it reaches the diametrical opposite point, it will pass over the opposite slot and admit steam to the chamber containing the opposite cylinder of the engine. Live steam will be thus admitted intermittently to the engine and alternately with respect to the two driving cylinders. To reverse the engine it is only necessary to throw over the reversing valve B by means of lever B⁵ and throw valves C by lever C⁷ and connecting mechanism so that they will stand in position to receive steam at the right-hand end of engine, as shown in Fig. 1, and exhaust at the left-hand end. The operation will be the same when running in one direction as in the other.

By taking the live steam around the cylinders, through the channel in the casing before described, before it reaches the inlet to the engine expansion chambers, a close fit between the cylinders and the bores in the casing is made practicable, without danger of any binding between the ports at the beginning of the operation.

Having thus fully described my said invention, what I claim as new and desire to secure by Letters Patent, is:

1. In a rotary engine, the combination, of the casing, comprising a part containing bores for the rotary cylinders and parts containing chambers and ports for the valve mechanism, said rotary cylinders mounted in said casing, the valve controlling mechanism comprising a hollow valve casing mounted at each end of the cylinders, each formed with ports in its inner wall leading into the chambers surrounding the driving cylinders and with ports in its outer wall, plates mounted over said ports in the outer walls containing ports which register with each other and with the ports in said casing, said plates being arranged to rock in reverse directions, a rotary plate on the engine shaft outside of said other plates formed with a port adapted to pass over the ports of said other plates, and a governor connected to said rocking plates for operating them substantially set forth.

2. In a rotary engine, the combination, of the casing, the cylinders, and the steam controlling mechanism comprising a valve mechanism at each end of the engine embodying a main shifting valve connected to operate together with ports in their adjacent walls arranged at one end of the engine to admit the steam to the expansion chambers surrounding the driving cylinders and at the opposite end to exhaust the steam from said chambers, the operating mechanism, plates for controlling the steam inlet ports mounted over ports in the outer walls of said casings and connected to a governor mechanism for operating them, said governor mechanism, and a rotary plate mounted on the engine shaft provided with a port leading from the steam chamber through said plates into said valve when said ports are in position to register, substantially set forth.

3. In a rotary engine, the combination, of the casing, the cylinders comprising a central cylinder with a spiral groove and cylinder mounted on each side thereof formed with a spiral vane to mesh with said groove, the steam chambers at each end of the casing divided by a valve mechanism into live steam and exhaust chambers, a valve mechanism for controlling the steam comprising a rocking casing formed with ports leading to the steam chambers of the casing and also to the steam chambers surrounding the cylinders, the rocking plates formed with ports which register with each other and with the ports in the outer walls of said casings, means operated by governor mechanism for rocking said plates in reverse directions to regulate the size of said ports, said governor mechanism, and a plate mounted to rotate with the engine shaft and formed with a port adapted to pass over the ports leading into said casing as said engine shaft revolves and admit the steam intermittently, substantially set forth.

4. In a rotary engine, the combination, of the casing having bores for the cylinders and seats and chambers for the valves, said cylinders, a reversing valve communicating at one end with the inlet and at the other end with the exhaust end of the engine, the valve mechanism for controlling the admission and exhaust of the steam mounted in steam chambers at each end of the casing and comprising a rocking valve casing having ports leading into the expansion chambers of the engine and ports leading to the steam chambers in the ends of the casing, plates for regulating the size of said inlet ports adapted to move in relation to each other, governor mechanism connected with said plates for operating them, and a rotary plate on the engine shaft covering the ports in said regulating plates and provided with a port which is adapted to admit steam to said valve as it passes over said inlet ports, substantially as set forth.

5. In a rotary engine, the combination, of the casing, the rotary cylinders mounted in bores in said casing, a steam inlet pipe communicating with a channel in said casing surrounding said bores, said casing being provided with steam chambers at each end outside the ends of said cylinders with which said channel communicates, valve mechanism for controlling the admission of the steam to said engine through the chamber at one end, and valve mechanism for controlling the exhaust of steam through the chamber at the other end, substantially set forth.

6. In a rotary engine, the combination, of the casing the rotary cylinders, the valve mechanism, said casing being formed with a channel surrounding the cylinders and a steam chamber at each end communicating therewith, the steam inlet pipe leading into said channel, said channel being arranged to discharge into the steam chamber at one end outside the expansion chambers of the engine and the chamber at the other end being arranged to receive the exhaust from the engine and discharge to the exhaust pipe, and valve mechanism for controlling said inlet and exhaust, substantially set forth.

7. In a rotary engine, the combination, of the casing having bores for the cylinders, steam inlet and exhaust ports, and suitable seats and chambers for the valve mechanism, said valve mechanism comprising a valve at each end of the engine for controlling the admission of the steam said valves being connected to operate together and arranged in relation to each other one in position to admit the steam to the engine at one end and the other to exhaust the steam at the other end, and governor controlled mechanism comprising oscillating plates formed with inter-engaging lugs and slots for regulating the supply of steam, substantially set forth.

8. In a rotary engine, the combination, of the casing having bores for the cylinders, steam inlet and exhaust ports, and suitable seats and chambers for the valve mechanism, said valve mechanism comprising a valve at each end of the engine for controlling the admission of the steam said valves being connected to operate together and arranged in relation to each other one in position to admit the steam to the engine at one end and the other to exhaust the steam at the other end, and oscillating plates with inter-engaging lugs and slots, substantially set forth.

In witness whereof, I, have hereunto set my hand and seal at Washington D. C. this sixteenth day of May, A. D. nineteen hundred and eight.

NEWELL H. MOTSINGER. [L. S.]

Witnesses:
 E. W. BRADFORD,
 L. A. PRICE.